United States Patent
Tomari et al.

(10) Patent No.: US 6,291,585 B1
(45) Date of Patent: Sep. 18, 2001

(54) TRANSPARENT RESIN COMPOSITIONS CONTAINING A THIURAM COMPOUND AND CERTAIN COPPER COMPOUNDS

(75) Inventors: Yukio Tomari; Naoyoshi Kawamoto, both of Takatsuki (JP)

(73) Assignee: Sumitomo Dow Limited, Tokyo (JP)

( * ) Notice: Subject to any disclaimer, the term of this patent is extended or adjusted under 35 U.S.C. 154(b) by 0 days.

(21) Appl. No.: 09/165,325

(22) Filed: Oct. 2, 1998

(30) Foreign Application Priority Data

Dec. 24, 1997 (JP) .................................................. 9-367406
Dec. 24, 1997 (JP) .................................................. 9-367430

(51) Int. Cl.[7] .............................. C08L 33/12; C08L 67/02; C08L 69/00
(52) U.S. Cl. ........................... 525/99; 525/202; 525/565; 525/601; 525/611
(58) Field of Search ................................. 524/82, 87, 99, 524/139, 104, 156, 157, 201, 202, 327, 394, 413, 420, 543, 560, 601, 611

(56) References Cited

U.S. PATENT DOCUMENTS

| | | | |
|---|---|---|---|
| 3,956,235 | 5/1976 | Pasternack et al. | |
| 4,837,280 | * 6/1989 | Awaji | 525/502 |
| 5,236,633 | 8/1993 | Satake et al. | 252/587 |
| 5,514,740 | 5/1996 | Miyake et al. | 524/420 |

FOREIGN PATENT DOCUMENTS

| | | | |
|---|---|---|---|
| 0 216 412 | 4/1987 | (EP) | C08K/5/00 |
| 0 351 875 | 1/1990 | (EP) | G11B/7/24 |
| 5-163400 | 6/1993 | (JP) . | |
| 5-163405 | 6/1993 | (JP) . | |
| 5-163408 | 6/1993 | (JP) . | |
| 5-163426 | 6/1993 | (JP) . | |
| 6-73197 | 3/1994 | (JP) | C08K/3/30 |
| 8-73653 | 3/1996 | (JP) | C08K/3/30 |

OTHER PUBLICATIONS

131:318952.*

* cited by examiner

*Primary Examiner*—Christopher Henderson
(74) *Attorney, Agent, or Firm*—Gary C. Cohn PLLC

(57) ABSTRACT

This invention provides transparent resin compositions of polycarbonate, polyester, methacrylic, styrene, polyvinyl chloride, polyolefin, and polyamide resin, having the advantageous effects of efficiently absorbing near infrared radiation (780–1800 nm) and efficiently transmitting visible light (380–780 nm). The invention provides transparent resin compositions with excellent near infrared absorption characteristics comprising 100 parts by weight of a transparent thermoplastic resin, about 0.01 to about 2 parts by weight of a specific thiuram compound and/or a specific metal dithiocarbamate compound, and about 0.01 to about 2 parts by weight of a specific copper compound. It also provides transparent resin compositions with excellent near infrared absorption characteristics comprising 100 parts by weight of a transparent thermoplastic resin, about 0.01 to about 2 parts by weight of a specific copper dithiocarbamate compound, and about 0 to about 2 parts by weight of a specific copper compound.

11 Claims, No Drawings

TRANSPARENT RESIN COMPOSITIONS CONTAINING A THIURAM COMPOUND AND CERTAIN COPPER COMPOUNDS

TECHNICAL FIELD OF THE INVENTION

This invention relates to transparent resin compositions that absorb near infrared radiation (with wavelengths in the range of 780–1800 nm). More particularly, it relates to excellent transparent resin compositions capable of both efficiently absorbing near infrared radiation and efficiently transmitting visible light (380–780 nm).

BACKGROUND OF THE PRIOR ART

Transparent resin materials with near infrared absorption characteristics possess both clearness and ability of heat radiation shielding by near infrared absorption. These features make them attractive as light-admitting materials for buildings, windows of transport vehicle, ceilings, doors, arcades, garages, sunrooms, greenhouses, etc.

Their ability of absorbing near infrared radiation also promises their uses in such applications as eye-protecting lenses and other safety glasses, infrared-sensitive filters, and photosensitive materials using semiconductor laser beam sources.

As a conventional transparent resin material with near infrared absorption characteristics, a polymer prepared by dissolving tungsten hexachloride and tin chloride in methyl methacrylates for polymerization is known (U.S. Pat. No. 3,692,688).

Other near infrared absorbers are, for example, a thiol-nickel complex (Japanese Patent Application Publication (Kokoku) No. 60-21294), chromium-cobalt complex salt (Japanese Patent Application Publication (Kokoku) No. 60-42269), anthraquinone derivative (Japanese Patent Application Public Disclosure (Kokai) No. 61-115958), and squarilium compound (Japanese Patent Application Public Disclosure (Kokai) No. 61-218551).

Instead of adding a near infrared absorber to resins, vapor deposition of aluminum, silver or other metal on one side of a polyethylene terephthalate film has also been practiced to manufacture a heat radiation reflecting film. The reflecting film, when laminated to a transparent resin material, achieves the dual effects of reflecting a heat radiation from the outside and suppressing an increase of the internal temperature.

PROBLEMS TO BE SOLVED BY THE INVENTION

The near infrared-absorbing, transparent resin materials of the prior art have had problems. For example, the near infrared absorbers of organic type are inferior in durability and have difficulties in sustaining their effect. Meanwhile, the absorbers of complex type are durable but absorb part of the radiation in the visible region too, and they often are colored and hence limited in use depending on the application.

Another prior art system of tungsten hexachloride and tin chloride is a good absorber of near infrared radiation but presents a problem of fading upon standing for many hours in the dark.

The heat radiation reflecting film obtained by the above-mentioned metal vapor deposition rather than by the addition of a near infrared absorber causes a problem of dimming rooms when it is laminated to window glasses. The metal vapor deposition layer reflects not merely heat radiation but visible light too, thus reducing the light transmission through the film. Moreover, adhering the film to a transparent resin material with adhesive tends to entrap air between the adhered surfaces. The entrapped air forms "blisters", which can swell. This can seriously reduce the transmission or cause the film to come off easily. A further problem is the tendency of metal oxidation with time, which leads to discoloration or diminished heat radiation reflectivity.

SUMMARY OF THE INVENTION

The present inventors have intensively searched for solutions to the foregoing problems. It has now been found, as a result, that mixing a transparent thermoplastic resin with a specific thiuram compound and/or a metal dithiocarbamate compound and a specific copper compound gives a transparent resin composition capable of efficiently absorbing near infrared radiation and also efficiently transmitting visible light and which, moreover, exhibits excellent durability. The present invention is predicated upon this finding.

In brief, the subject of the invention is a transparent resin composition with excellent near infrared absorption characteristics which comprises 100 parts by weight of a transparent thermoplastic resin, about 0.01 to about 2 parts by weight of a thiuram compound of the general formula (A):

(A)

in which $R_1$ and $R_2$ are the same or different and represent monovalent groups selected from the group consisting of hydrogen, alkyl, cycloalkyl, aryl, aralkyl, and 5- or 6-membered heterocyclic groups, each of which may contain one or more substituents, or form together a ring, and m and n are integers of 1 to 4 each, and/or a metal dithiocarbamate compound of the general formula (B):

(B)

in which $R_3$ and $R_4$ are the same or different and represent monovalent groups selected from the group consisting of hydrogen, alkyl, cycloalkyl, aryl, aralkyl, and 5- or 6-membered heterocyclic group, each of which may contain one or more substituents, or form a ring, M is Zn, Co, Ni, Fe, Na or K, and p is an integer of 1 to 4 equivalent to the valency of M, and about 0.01 to about 2 parts by weight of a copper compound of the general formula (C):

(C):

in which X is sulfur, fluorine, chlorine, —CN, phthalocyanyl, sodium chlorophyllin, bisacetylacetate or $R_5$—Y (wherein $R_5$ is a monovalent group selected from the group consisting of hydrogen, alkyl, cycloalkyl, aryl, aralkyl, and heterocyclic group, each of which may contain one or more substituents, and Y is —COO, —$SO_4$, —$SO_3$, —$PO_4$ or —O), and q is 1 or 2.

Another subject of the invention is a transparent resin composition with excellent near infrared absorption characteristics which comprises 100 parts by weight of a transparent thermoplastic resin, about 0.01 to about 2 parts by weight of a copper dithiocarbamate compound of the general formula (D):

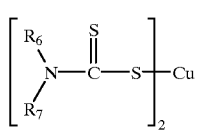

(D)

in which $R_6$ and $R_7$ are the same or different and represent monovalent groups selected from the group consisting of hydrogen, alkyl, cycloalkyl, aryl, aralkyl, and 5- or 6-membered heterocyclic group, each of which may contain one or more substituents, or form together a ring, and 0 to about 2 parts by weight of a copper compound of the general formula (C) above.

DETAILED DESCRIPTION OF THE INVENTION

The invention will now be described in more detail.

Transparent thermoplastic resin which may be used for the present invention includes, but are not limited to, transparent resin material such as polycarbonate, polyester, methacrylic, styrene, polyvinyl chloride, polyolefin and polyamide resin. These resins may be used singly or as a mixture of two or more.

The term polycarbonate resin as used herein means the polymers obtained either by the phosgene process in which any of varied dihydroxydiaryl compound is reacted with phosgene or by the ester exchange process in which a dihydroxydiaryl compound is reacted with carbonic ester such as diphenyl carbonate. Typical of them is a polycarbonate resin produced from 2,2-bis(4-hydroxyphenyl) propane (bisphenol A).

Examples of the dihydroxydiaryl compounds, besides bisphenol A, are: bis(hydroxyaryl)alkanes, such as bis(4-hydroxyphenyl)methane, 1,1-bis(4-hydroxyphenyl)ethane, 2,2-bis(4-hydroxyphenyl)butane, 2,2-bis(4-hydroxyphenyl) octane, bis(4-hydroxyphenyl)phenylmethane, 2,2-bis(4-hydroxyphenyl-3-methylphenyl)propane, 1,1-bis(4-hydroxy-3-tert.butylphenyl)propene, 2,2-bis(4-hydroxy-3-bromophenyl)propane, 2,2-bis(4-hydroxy-3,5-dibromophenyl)propane, and 2,2-bis(4-hydroxy-3,5-dichlorophenyl)propane; bis(hydroxyaryl)cycloalkanes, such as 1,1-bis(4-hydroxyphenyl)cyclopentane and 1,1-bis (4-hydroxyphenyl)cyclohexane; dihydroxydiaryl ethers, such as 4,4'-dihydroxydiphenyl ether and 4,4'-dihydroxy-3, 3'-dimethyldiphenyl ether; dihydroxydiaryl sulfides, such as 4,4'-dihydroxydiphenyl sulfide; dihydroxyaryl sulfoxides, such as 4,4'-hydrodiphenyl sulfoxide and 4,4'-dihydroxy-3, 3'-dimethyldiphenyl sulfoxide; and dihydroxydiaryl sulfones, such as 4,4'-dihydroxydiphenyl sulfone and 4,4'-dihydroxy-3,3'-dimethyldiphenyl sulfone.

Such a dihydroxyaryl compound may be used in combination with a trivalent or more polyvalent phenol compound. Tri- or more polyvalent phenols include phloroglucin, 4,6-dimethyl-2,4,6-tri(4-hydroxyphenyl)heptene, 2,4,6-dimethyl-2,4,6-tri(4-hydroxyphenyl)heptane, 1,3,5-tri(4-hydroxyphenyl)benzole, 1,1,1-tri(4-hydroxyphenyl)ethane, and 2,2-bis[4,4-(4,4'-dihydroxydiphenyl)cyclohexyl] propane.

The polyester resin is, for example, polyethylene terephthalate, polybutylene terephthalate, polyacrylate or polyether ether ketone.

By methacrylic resin is meant the polymers of various esters of methacrylic acid or the copolymers of the polymers with other monomers. Examples are various homopolymers of various methacrylic esters, such as methyl methacrylate, ethyl methacrylate, and butyl methacrylate, and copolymers of those methacrylic esters and various acrylic esters, acrylic acid, styrene, α-methylstyrene, etc.

Among styrene resins are the polymers of styrene monomers and copolymers obtained from a styrene monomer and a monomer copolymerizable with the styrene monomer (optionally in the presence of a rubbery substance). Styrene monomers include styrene, a-methylstyrene, and styrene derivatives with benzene rings in which hydrogen atom is replaced by a halogen atom or an alkyl group containing 1 to 2 carbon atoms. Typical examples are styrene, o-chlorostyrene, p-chlorostyrene, 2,4-dimethylstyrene, and t-butylstyrene. Examples of copolymerizable monomers are: acrylonitrile monomers, such as (meth)acrylonitrile, α-chloroacrylonitrile, and vinylidene cyanide; (meth)acrylic acids and their esters, such as (meth)acrylic acid, methyl (meth)acrylate, ethyl (meth)acrylate, butyl (meth)acrylate, glycidyl (meth)acrylate, 2-ethylhexylbutyl (meth)acrylate, and β-hydroxyethyl (meth)acrylate; and vinyl acetate, vinyl chloride, vinylidene chloride, vinyl pyrrolidone, (meth) acrylamides, maleic anhydride, itaconic anhydride, and maleimides. Examples of rubbery substances are polybutadiene rubber, styrene-butadiene copolymer rubber, ethylene-propylene rubber, butadiene-acrylonitrile copolymer rubber, butyl rubber, acrylic rubber, styrene-isobutylene-butadiene copolymer rubber, and isoprene-acrylic ester copolymer rubber.

Polyvinyl chloride resins are, for example, homopolymers of vinyl chloride and copolymers of such a homopolymer and a small amount of a comonomer, and graft copolymers. Polymer blends of such a polymer and vinylidene chloride resin, ethylene-vinyl acetate copolymer, polyethylene chloride, etc. may also be employed.

By polyolefin resins is meant either α-olefin homopolymers or copolymers of an α-olefin and another copolymerizable monomer. Typical of them are polyethylene, polypropylene, ethylene-propylene copolymer, ethylene-butene copolymer, ethylene-4-methyl-1-pentene copolymer, ethylene-vinyl acetate copolymer, and ethylene-acrylate copolymer. Of those, the low-density polyethylene having a density in the range of 0.910 to 0.935, ethylene-α-olefin copolymer, and ethylene-vinyl acetate copolymer having a vinyl acetate content of 30 wt % or less are desirable as agricultural films with transparency and weather resistance. Among these desirable copolymers, the ethylene-vinyl acetate copolymer with a vinyl acetate content between about 5 and about 30 wt % is preferred on account of its better transparency, flexibility, and weather resistance.

Polyamide resins are, for example, nylon-6, nylon-66, nylon-12, and nylon-46.

The thiuram compound to be used in the present invention is a compound represented by the general formula (A)

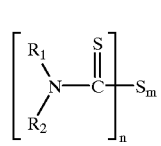

(A)

in which $R_1$ and $R_2$ are the same or different and represent monovalent groups selected from the group consisting of hydrogen, alkyl, cycloalkyl, aryl, aralkyl, and 5- or 6-membered heterocyclic group, each of which may contain one or more substituents, or form together a ring, and m and n are integers of 1 to 4 each.

Examples of the thiuram compound are tetramethylthiuram monosulfide, tetramethylthiuram disulfide, tetraethylthiuram disulfide, tetrabutylthiuram disulfide, and dipentamethylenethiuram tetrasulfide. Of these, tetramethylthiuram disulfide

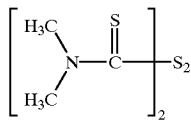

and dipentamethylenethiuram tetrasulfide

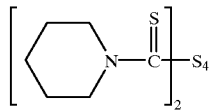

are preferably used.

The amount of such a thiuram compound to be used is in the range of about 0.01 to about 2 parts by weight per 100 parts by weight of a transparent thermoplastic resin. An amount of less than about 0.01 part by weight makes the resulting composition inferior in absorption of light in the near infrared region. An amount of more than about 2 parts by weight is also undesirable since it reduces the visible light transmission. A preferred range is about 0.05 to about 0.5 part by weight, and a more preferred range is about 0.1 to about 0.2 part by weight.

The metal dithiocarbamate compound to be used in the invention is a compound represented by the general formula (B)

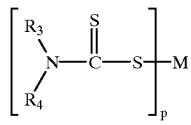

in which $R_3$ and $R_4$ are the same or different and represent monovalent groups selected from the group consisting of hydrogen, alkyl, cycloalkyl, aryl, aralkyl, and 5- or 6-membered heterocyclic group, each of which may contain one or more substituents, or form together a ring, M is Zn, Co, Ni, Fe, Na or K, and p is an integer of 1 to 4 equivalent to the valency of M.

Exemplary metal dithiocarbamate compounds are nickel dimethyldithiocarbamate, zinc dimethyldithiocarbamate, zinc diethyldithiocarbamate, zinc dibutyldithiocarbamate, zinc ethylphenyldithiocarbamate, tellurium diethyldithiocarbamate, iron dimethyldithiocarbamate, sodium dimethyldithiocarbamate, and sodium diethyldithiocarbamate. Above all, nickel dimethyldithiocarbamate is preferably used.

The amount of the metal dithiocarbamate compound to be used ranges from about 0.01 to about 2 parts by weight per 100 parts by weight of a transparent thermoplastic resin. If the amount is less than about 0.01 part by weight the resulting composition will be inferior in absorption of light in the near infrared region. An amount in excess of about 2 parts by weight is again undesirable because it reduces the visible light transmission. The range is preferably about 0.05 to about 0.5 part by weight, and more preferably about 0.1 to about 0.2 part by weight.

The copper dithiocarbamate compound to be used in the invention is a compound represented by the general formula (D):

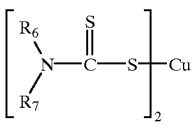

in which $R_6$ and $R_7$ are the same or different and represent monovalent groups selected from the group consisting of hydrogen, alkyl, cycloalkyl, aryl, aralkyl, and 5- or 6-membered heterocyclic group, each of which may contain one or more substituents, or form together a ring.

Examples of the copper dithiocarbamate compound are copper dimethyldithiocarbamate, copper diethyldithiocarbamate, copper dibutyldithiocarbamate, and copper ethylphenyldithiocarbamate. Of these, copper dimethyldithiocarbamate is preferred.

The amount of a copper dithiocarbamate compound to be used is about 0.01 to about 2 parts by weight per 100 parts by weight of a transparent thermoplastic resin. An amount of less than about 0.01 part by weight results in inadequate absorption of light in the near infrared region. An amount of more than about 2 parts by weight is undesirable either because it reduces the visible light transmission. The range is preferably about 0.05 to about 0.5 part by weight, and more preferably about 0.1 to about 0.2 part by weight.

The copper compound to be used in the invention is a compound represented by the general formula (C):

$$X_qCu \qquad (C)$$

in which X is sulfur, fluorine, chlorine, —CN, phthalocyanyl, sodium chlorophyllin, bisacetylacetate or $R_5$—Y (wherein $R_5$ is a monovalent group selected from the group consisting of hydrogen, alkyl, cycloalkyl, aryl, aralkyl, and heterocyclic group, each of which may contain one or more substituents, and Y is —COO, —$SO_4$, —$SO_3$, —$PO_4$ or —O), and q is 1 or 2.

Examples of the copper compound are copper stearate, copper sulfide, and copper phthalocyanyl. Among these, copper stearate is most desirably used.

The amount of the copper compound, when it is used together with a thiuram compound and/or a metal dithiocarbamate compound, is about 0.01 to about 2 parts by weight per 100 parts by weight of a transparent thermoplastic resin. If the amount is below about 0.01 part by weight, the light absorption characteristics in the near infrared region will be inadequate. If the amount exceeds about 2 parts by weight, the visible light transmission will decrease undesirably. The range is preferably about 0.05 to about 0.5 part by weight, and more preferably about 0.1 to about 0.4 part by weight.

The amount of the copper compound, when it is used together with a copper dithiocarbamate compound, is about 0 to about 2 parts by weight per 100 parts by weight of a transparent thermoplastic resin. The range is preferably about 0 to about 0.5 part by weight, and more preferably about 0 to about 0.4 part by weight.

The transparent thermoplastic resin may be mixed with any of various heat stabilizers, infrared absorbers, ultraviolet absorbers, colorants, fluorescent brighteners, mold releasing agents, antiblocking agents (silica, crosslinked polystyrene beads, etc.), softening agents, antistatic agents, and other additives, provided that these materials do not impair the advantageous effects of the invention.

There is no special limitation to the method of mixing the thiuram compound and/or the metal dithiocarbamate compound and copper compound in the transparent resin composition of the invention. For example, either mixing by means of a conventional mixer such as a tumbler or ribbon blender or melt mixing by an extruder may be used.

EXAMPLES

The following examples illustrate the invention without however limiting it. All parts and % are by weight.

Examples 1–9 & 12–16 and Comparative Examples 1–5 & 10–14

As a transparent thermoplastic resin, 100 parts of a polycarbonate resin ("Calibre (trademark of the Dow Chemical Company) 200-3" available from Sumitomo Dow Ltd., with a viscosity-average molecular weight of 28,000) is mixed with various compounds in amounts given in Table 1. The mixtures are each melt mixed by a 40 mm-diameter extruder (a single-screw extruder manufactured by Tanabe Plastics) at 280° C. and at a screw speed of 80 rpm. Various pelletized products are thus obtained.

The pellets so obtained are molded by an injection molding machine (Model "J-100" manufactured by Japan Steel Works) at 300° C. into flat sheet samples (90×50×3 mm). Light transmission ($\tau_\lambda$) at wavelengths in the range of 380–1800 nm through these flat sheet samples is measured using a spectrophotometer (Model "UV3100" manufactured by Shimadzu Seisakusho LTD.). The visible light transmission ($\tau_v$, 380–780 nm) and the solar radiation transmission ($\tau_e$, 340–1800 nm) values of the heat radiation shielding sheet are determined in conformity with the procedures of Japan Industrial Standard (JIS) R-3106.

The visible light transmission ($\tau_v$) is calculated from the light transmission ($\tau_\lambda$) by the equation $$\tau_v = \frac{\sum_{380}^{780} D\lambda \cdot V\lambda \cdot \tau(\lambda)}{\sum_{380}^{780} D\lambda \cdot V\lambda}$$

in which $D\lambda$ is the spectral distribution of a standard illuminant $D_{65}$, $V\lambda$ is the CIE photopic spectral luminous efficiency, and for the $D\lambda \cdot V\lambda$ the numerical value given in Table 5 below (which corresponds to Table 1 of JIS R-3106) is used.

The solar radiation transmission ($\tau_e$) is calculated from the light transmission ($\tau_\lambda$) by the equation $$\tau_e = \sum_{340}^{1800} E\lambda \cdot \Delta\lambda \cdot \tau(\lambda)$$

in which $E\lambda$ is the standard spectral distribution of a relative value of the directly reaching solar radiation, $\Delta\lambda$ is the breadth of wavelengths, and for the $E\lambda \cdot \Delta\lambda$ the numerical value given in Table 6 below (which corresponds to Table 2 of JIS R-3106) is used.

Also, the solar radiation transmission ($\tau_e$) is divided by the visible light transmission ($\tau_v$) to find the ratio ($\tau_e/\tau_v$). The lower this ratio the larger the absorption of heat radiation.

Next, haze values are determined in conformity with JIS K-7105. The lower the haze value the better the visual light transmission.

Examples 10, 17, & 18 and Comparative Examples 6–7 & 15–16

As a transparent thermoplastic resin, a polyethylene terephthalate resin ("UE-3600" available from Unitika Ltd.) is used. Mixtures are melt mixed at 220° C. and at a screw speed of 80 rpm and are molded to form flat sheet samples at 220° C. For the remainder of operation, the same procedure as performed in the Examples that use the polycarbonate resin is repeated.

Examples 11, 19, & 20 and Comparative Examples 8–9 & 17–18

As a transparent thermoplastic resin, a polymethyl methacrylate resin ("Sumipex EX" available from Sumitomo Chemical Co., Ltd.) is used. Mixtures are melt mixed at 240° C. and at a screw speed of 80 rpm and are molded to form flat sheet samples at 240° C. For the rest of operation, the procedure followed in the Examples that use the polycarbonate resin is repeated.

The results of the foregoing Examples and Comparative Examples are summarized in Tables 1 to 4.

The criteria used in judging essential properties are as follows:

| | |
|---|---|
| Visible light transmission ($\tau_v$) | 3.0 or more is desirable. |
| Solar radiation transmission ($\tau_e$) | 60 or less is desirable. |
| $\tau_e/\tau_v$ ratio | 0.8 or less is desirable. |
| Haze (%) | 2.0 or less is desirable. |

TABLE 1

| Examples | 1 | 2 | 3 | 4 | 5 | 6 | 7 | 8 | 9 | 10 | 11 |
|---|---|---|---|---|---|---|---|---|---|---|---|
| PC (parts) | 100 | 100 | 100 | 100 | 100 | 100 | 100 | 100 | 100 | — | — |
| PET (parts) | — | — | — | — | — | — | — | — | — | 100 | — |
| PMMA (parts) | — | — | — | — | — | — | — | — | — | — | 100 |
| Thiuram 1 (parts) | 0.05 | 1.5 | 1.5 | 0.05 | — | — | 0.1 | 0.2 | 0.1 | 0.2 | 0.2 |
| Thiuram 2 (parts) | — | — | — | — | — | 0.2 | — | — | — | — | — |
| Dithiocarmamate (parts) | — | — | — | — | 0.2 | — | 0.1 | — | — | — | — |
| Copper compound 1 (parts) | 0.05 | 0.05 | 1.5 | 1.5 | 0.2 | 0.2 | 0.2 | 0.2 | 0.2 | 0.2 | 0.2 |
| $\tau_v$ | 56.8 | 5.2 | 3.5 | 4.6 | 5.4 | 27.5 | 7.8 | 9.9 | 12.6 | 23.1 | 9.8 |
| $\tau_e$ | 32.3 | 1.8 | 1.1 | 1.4 | 2.4 | 17.9 | 4.1 | 7.3 | 7.9 | 10.2 | 6.2 |
| $\tau_e/\tau_v$ ratio | 0.57 | 0.35 | 0.31 | 0.3 | 0.44 | 0.65 | 0.53 | 0.73 | 0.63 | 0.44 | 0.63 |
| Haze (%) | 0.8 | 1.4 | 1.8 | 1.4 | 1.4 | 1.3 | 1.2 | 1.2 | 1.1 | 1.4 | 1.2 |

Notes:

TABLE 1-continued

| Examples | 1 | 2 | 3 | 4 | 5 | 6 | 7 | 8 | 9 | 10 | 11 |
|---|---|---|---|---|---|---|---|---|---|---|---|

PC = polycarbonate resin;
PET = polyethylene terephthalate resin;
PMMA = polymethyl methacrylate resin;
thiuram 1 = dipentamethylenethiuram tetrasulfide;
thiuram 2 = tetramethylthiuram disulfide;
dithiocarbamate 1 = nickel dimethyldithiocarbamate;
copper compound 1 = copper stearate.

TABLE 2

| Comparative Examples | 1 | 2 | 3 | 4 | 5 | 6 | 7 | 8 | 9 |
|---|---|---|---|---|---|---|---|---|---|
| PC (parts) | 100 | 100 | 100 | 100 | 100 | — | — | — | — |
| PET (parts) | — | — | — | — | — | 100 | 100 | — | — |
| PMMA (parts) | — | — | — | — | — | — | — | 100 | 100 |
| Thiuram 1 (parts) | — | 0.005 | 0.2 | 2.5 | 0.2 | — | 0.2 | — | 0.005 |
| Copper compound 1 (parts) | — | 0.2 | 0.005 | 0.2 | 2.5 | — | 0.005 | — | 0.2 |
| $\tau_V$ | 88.5 | 66.3 | 73.8 | 1.2 | 1.4 | 86.7 | 74.5 | 90.8 | 65.2 |
| $\tau_e$ | 86.6 | 58.3 | 67.9 | 0.5 | 0.6 | 83.5 | 65.6 | 87.1 | 54.8 |
| $\tau_e/\tau_V$ ratio | 0.98 | 0.88 | 0.92 | 0.42 | 0.43 | 0.96 | 0.88 | 0.96 | 0.84 |
| Haze (%) | 0.6 | 1.1 | 1.5 | 2.6 | 3.2 | 0.8 | 1.2 | 0.4 | 1.1 |

Notes:
PC = polycarbonate resin;
PET = polyethylene terephthalate resin:
PPMA = polymethyl methacrylate resin;
thiuram 1 = dipentamethylenethiuram tetrasulfide;
copper compound 1 = copper stearate.

TABLE 3

| Examples | 12 | 13 | 14 | 15 | 16 | 17 | 18 | 19 | 20 |
|---|---|---|---|---|---|---|---|---|---|
| PC (parts) | 100 | 100 | 100 | 100 | 100 | — | — | — | — |
| PET (parts) | — | — | — | — | — | 100 | 100 | — | — |
| PMMA (parts) | — | — | — | — | — | — | — | 100 | 100 |
| Copper dithiocarbamate 1 (parts) | 0.05 | 1.5 | 0.2 | 0.2 | 0.2 | 0.2 | 0.2 | 0.2 | 0.2 |
| Copper compound 1 (parts) | — | — | — | 0.2 | 1.5 | — | 0.2 | — | 0.2 |
| $\tau_V$ | 54.6 | 8.7 | 19.6 | 5.4 | 3.2 | 20.5 | 5.8 | 41.3 | 10.6 |
| $\tau_e$ | 41 | 5.9 | 10.8 | 2.4 | 1.0 | 9.2 | 2.5 | 18.6 | 5.1 |
| $\tau_e/\tau_V$ ratio | 0.75 | 0.68 | 0.55 | 0.44 | 0.31 | 0.45 | 0.41 | 0.45 | 0.48 |
| Haze (%) | 0.8 | 1.1 | 1.2 | 1.4 | 1.5 | 1.2 | 1.3 | 1.2 | 1.5 |

Notes:
PC = polycarbonate resin;
PET = polyethylene terephthalate resin;
PMMA = polymethyl methacrylate resin;
copper dithiocarbamate 1 = copper dimethyldithiocarbamate;
copper compound 1 = copper stearate.

TABLE 4

| Comparative Examples | 10 | 11 | 12 | 13 | 14 | 15 | 16 | 17 | 18 |
|---|---|---|---|---|---|---|---|---|---|
| PC (parts) | 100 | 100 | 100 | 100 | 100 | — | — | — | — |
| PET (parts) | — | — | — | — | — | 100 | 100 | — | — |
| PMMA (parts) | — | — | — | — | — | — | — | 100 | 100 |
| Copper dithiocarbamate 1 (parts) | — | 0.005 | 0.2 | 2.5 | — | — | 2.5 | — | 0.005 |
| Zinc dithiocarbamate 1 (parts) | — | — | — | — | 0.2 | — | — | — | — |
| Copper compound 1 (parts) | — | — | 3 | — | — | — | — | — | — |
| $\tau_V$ | 88.5 | 87.5 | 0.8 | 1.1 | 52.5 | 86.7 | 1.3 | 90.8 | 89.2 |
| $\tau_e$ | 86.6 | 85.4 | 0.2 | 0.6 | 24.8 | 83.5 | 0.7 | 87.1 | 86.6 |
| $\tau_e/\tau_V$ ratio | 0.98 | 0.98 | 0.25 | 0.55 | 0.47 | 0.96 | 0.54 | 0.96 | 0.97 |
| Haze (%) | 0.6 | 0.7 | 4.5 | 1.7 | 55.5 | 0.8 | 1.8 | 0.4 | 0.5 |

Notes:
PC = polycarbonate resin;
PET = polyethylene terephthalate resin;
PMMA = polymethyl methacrylate resin;
copper dithiocarbamate 1 = copper dimethyldithiocarbamate;
zinc dithiocarbamate 1 = zinc dimethyldithiocarbamate;
copper compound 1 = copper stearate.

Advantageous Effects of the Invention

Transparent resin compositions according to the present invention efficiently absorb near infrared and heat radiation, efficiently transmit visible light, and exhibit outstanding durability.

As Tables 1 and 3 indicate, all the transparent resin compositions of the invention show excellent properties, with visible light transmission ($\tau_v$), a measure of the proportion of visible light transmitted through the samples, of at least 3.0; solar radiation transmission ($\tau_e$), a measure of the proportion of near infrared radiation absorbed, of 60 or below; $\tau_e/\tau_v$ ratio of 0.8 or below; and haze, a measure of cloudiness in the outward appearance of a transparent resin, of 2.0 or less.

In contrast with these, Comparative Examples 2 and 9 in Table 2 which use a small proportion of a thiuram compound and Comparative Examples 11 and 18 in Table 4 which use a small proportion of copper dithiocarbamate show $\tau_e/\tau_v$ ratios, a measure of the proportion of near infrared radiation absorbed, in excess of 0.8, indicating their inadequate capacities for near infrared absorption.

On the other hand, Comparative Example 4 in Table 2 which contain a large amount of a thiuram compound and Comparative Examples 13 and 16 in Table 4 which contain a large amount of copper dithiocarbamate possess remarkable near infrared absorption capacities but they absorb visible light too, with visible light transmission ($\tau_v$) values of less than 3.0.

Comparative Examples 3 and 7 in Table 2 which use a small proportion of a copper compound together with a thiuram compound show insufficient capacities for near infrared absorption, with $\tau_e/\tau_v$ ratios, a measure of the proportion of near infrared radiation absorbed, in excess of 0.8. Comparative Example 5 in Table 2 which contain a large proportion of a copper compound is undesirable because, with visible light transmission ($\tau_v$) of less than 3.0, it absorbs visible light and shows an excessive high haze value.

Even when copper dithiocarbamate and a copper compound are used in combination, a large copper compound content is undesirable because, as Comparative Example 12 in Table 4 demonstrates, the visible light transmission ($\tau_v$) of the transparent resin decreases below 3.0, resulting in absorption of visible light and an increased haze value.

Comparative Example 14 in Table 4 which uses zinc dithiocarbamate as a metal salt other than copper dithiocarbamate is undesirable either because of an unusually high haze value.

TABLE 5

Coefficients for the calculation of visible light transmission and visible light reflection

| Wavelength λ(nm) | Dλ · Vλ |
| --- | --- |
| 380 | 0.00 |
| 390 | 0.01 |
| 400 | 0.03 |
| 410 | 0.11 |
| 420 | 0.37 |
| 430 | 1.01 |
| 440 | 2.41 |
| 450 | 4.45 |
| 460 | 7.07 |
| 470 | 10.45 |
| 480 | 16.12 |
| 490 | 22.63 |
| 500 | 35.32 |
| 510 | 54.22 |
| 520 | 74.40 |
| 530 | 92.83 |
| 540 | 99.61 |

TABLE 5-continued

Coefficients for the calculation of visible light transmission and visible light reflection

| Wavelength λ(nm) | Dλ · Vλ |
| --- | --- |
| 550 | 103.52 |
| 560 | 99.50 |
| 570 | 91.71 |
| 580 | 83.34 |
| 590 | 67.14 |
| 600 | 56.80 |
| 610 | 45.07 |
| 620 | 33.41 |
| 630 | 22.07 |
| 640 | 14.65 |
| 650 | 8.56 |
| 660 | 4.89 |
| 670 | 2.63 |
| 680 | 1.33 |
| 690 | 0.57 |
| 700 | 0.29 |
| 710 | 0.16 |
| 720 | 0.06 |
| 730 | 0.04 |
| 740 | 0.02 |
| 750 | 0.01 |
| 760 | 0.00 |
| 770 | 0.00 |
| 780 | 0.00 |

$$\sum_{380}^{780} D2 \cdot V2 = 1056.81$$

TABLE 6

Coefficients for the calculation of solar radiation transmission, solar radiation reflection and solar radiation absorption characteristics

| Wavelength λ (nm) | Eλ 3· Δλ | Wavelength λ (nm) | Eλ · Δλ |
| --- | --- | --- | --- |
| 340 | 0.00291 | 670 | 0.01459 |
| 350 | 0.00346 | 680 | 0.01447 |
| 360 | 0.00385 | 690 | 0.01438 |
| 370 | 0.00474 | 700 | 0.01418 |
| 380 | 0.00494 | 710 | 0.01403 |
| 390 | 0.00527 | 720 | 0.01085 |
| 400 | 0.00739 | 730 | 0.01165 |
| 410 | 0.00967 | 740 | 0.01309 |
| 420 | 0.01023 | 750 | 0.01327 |
| 430 | 0.01012 | 760 | 0.00314 |
| 440 | 0.01171 | 770 | 0.01292 |
| 450 | 0.01354 | 780 | 0.01271 |
| 460 | 0.01447 | 800 | 0.04704 |
| 470 | 0.01476 | 850 | 0.05583 |
| 480 | 0.01546 | 900 | 0.04255 |
| 490 | 0.01497 | 950 | 0.02365 |
| 500 | 0.01525 | 1000 | 0.04004 |
| 510 | 0.01508 | 1050 | 0.03601 |
| 520 | 0.01496 | 1100 | 0.02933 |
| 530 | 0.01521 | 1150 | 0.01202 |
| 540 | 0.01534 | 1200 | 0.02398 |
| 550 | 0.01543 | 1250 | 0.02061 |
| 560 | 0.01543 | 1300 | 0.01929 |
| 570 | 0.01551 | 1350 | 0.00978 |
| 580 | 0.01566 | 1400 | 0.00192 |
| 590 | 0.01567 | 1450 | 0.00522 |
| 600 | 0.01541 | 1500 | 0.01077 |
| 610 | 0.01525 | 1550 | 0.01453 |
| 620 | 0.01516 | 1600 | 0.01328 |
| 630 | 0.01510 | 1650 | 0.01189 |

TABLE 6-continued

Coefficients for the calculation of solar radiation transmission, solar radiation reflection and solar radiation absorption characteristics

| Wavelength $\lambda$ (nm) | $E\lambda \cdot 3 \cdot \Delta\lambda$ | Wavelength $\lambda$ (nm) | $E\lambda \cdot \Delta\lambda$ |
|---|---|---|---|
| 640 | 0.01506 | 1700 | 0.01070 |
| 650 | 0.01492 | 1750 | 0.00945 |
| 660 | 0.01481 | 1800 | 0.00609 |

Notes: $\Delta\lambda = 10$ nm at $\lambda = 340\sim780$ nm
$\Delta\lambda = 40$ nm (785~825 nm) at $\lambda = 800$ nm
$\Delta\lambda = 50$ nm at $\lambda = 850\sim1800$ nm

What is claimed is:

1. A transparent resin composition with near infrared absorption characteristics which comprises 100 parts by weight of a transparent thermoplastic resin, from about 0.01 to about 2 parts by weight of (1) a thiuram compound of the general formula (A):

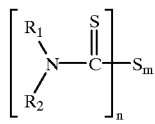 (A)

in which $R_1$ and $R_2$ are the same or different and represent monovalent groups selected from the group consisting of hydrogen, alkyl, cycloalkyl, aryl and aralkyl, or form together a ring, and m and n are integers of 1 to 4, (2) a metal dithiocarbamate compound of the general formula (B):

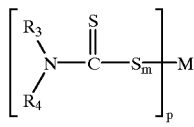 (B)

in which $R_3$ and $R_4$ are the same or different and represent monovalent groups selected from the group consisting of hydrogen, alkyl, cycloalkyl, aryl and aralkyl, or form together a ring, M is Co, Ni, Fe, Na or K, and p is an integer of about 1 to about 4 equivalent to the valency of M, or a mixture of (1) and (2), and from about 0.01 to about 2 parts by weight of a copper compound of the general formula (C):

$X_q Cu$ (C)

in which X is sulfur, fluorine, chlorine, —CN, phthalocyanyl, sodium cholorphyllin, bisacetylacetate or $R_5$—Y (wherein $R_5$ is a monovalent group selected from the group consisting of hydrogen, alkyl, cycloalkyl, aryl, aralkyl and Y is —COO, —$SO_4$, —$SO_3$, —$PO_4$ or —O), and q is 1 or 2.

2. A composition according to claim 1, wherein said thiuram compound is tetramethylthiuram disulfide or dipentamethylenethiuram tetrasulfide.

3. A composition according to claim 1, wherein said metal dithiocarbamate compound is nickel dimethyldithiocarbamate.

4. A composition according to claim 2, wherein said metal dithiocarbamate compound is nickel dimethyldithiocarbamate.

5. A composition according to claim 1, wherein the total amount of said thiuram compound and/or said metal dithiocarbamate compound is from about 0.05 to about 0.5 part by weight and the amount of said copper compound is from about 0.05 to about 0.5 part by weight.

6. A composition according to claim 2, wherein the total amount of said thiuram compound and/or said metal dithiocarbamate compound is from about 0.05 to about 0.5 part by weight and the amount of said copper compound is from about 0.05 to about 0.5 part by weight.

7. A composition according to claim 4, wherein the total amount of said thiuram compound and/or said metal dithiocarbamate compound is from about 0.05 to about 0.5 part by weight and the amount of said copper compound is from about 0.05 to about 0.5 part by weight.

8. A composition according to claim 1, wherein said copper compound is copper stearate.

9. A composition according to claim 1, wherein said transparent thermoplastic resin comprises at least one resin selected from the group consisting of polycarbonate resin, polyester resin, methacrylic resin, styrene resin, polyvinyl chloride resin, polyolefin resin and polyamide resin.

10. A composition according to claim 2, wherein said transparent thermoplastic resin comprises at least one resin selected from the group consisting of polycarbonate resin, polyester resin, methacrylic resin, styrene resin, polyvinyl chloride resin, polyolefin resin and polyamide resin.

11. A composition according to claim 8, wherein said transparent thermoplastic resin comprises at least one resin selected from the group consisting of polycarbonate resin, polyester resin, methacrylic resin, styrene resin, polyvinyl chloride resin, polyolefin resin and polyamide resin.

* * * * *